3,565,960
PROCESS FOR THE PREPARATION OF
FLUID PHENOXYBIPHENYLS
Robert M. Schisla, Kirkwood, and Harold I. Weingarten,
St. Louis, Mo., assignors to Monsanto Company, St.
Louis, Mo., a corporation of Delaware
No Drawing. Continuation-in-part of application Ser. No.
333,737, Dec. 26, 1963. This application Mar. 13, 1967,
Ser. No. 622,479
Int. Cl. C07c 43/22
U.S. Cl. 260—613                                7 Claims

ABSTRACT OF THE DISCLOSURE

A process for the preparation of a fluid phenoxybiphenyl compound or phenoxybiphenyl composition enriched in fluid phenoxybiphenyl compounds comprising the steps of contacting a solid phenoxybiphenyl compound or composition containing one or more solid phenoxybiphenyl compounds with hydrogen chloride and a class of catalysts representative of which are aluminum trichloride, aluminum tribromide, gallium trichloride, stannic chloride and antimony pentachloride. A fluid phenoxybiphenyl compound and compositions thereof have many uses, among which are use as hydraulic fluids and heat transfer fluids.

---

This application is a continuation-in-part of application Ser. No. 333,737, filed Dec. 26, 1963, and now abandoned.

The invention relates to a process for the preparation of a fluid phenoxybiphenyl compound and phenoxybiphenyl compositions enriched in fluid phenoxybiphenyls.

Functional fluids can be employed as synthetic lubricants for jets engines, as hydraulic fluids and lubricants for supersonic aircraft and missiles, vacuum diffusion pump fluids, as coolants for electronic equipment, as coolant moderators for nuclear reactors, as heat transfer agents, etc., wherein the fluids are often required to function at extreme temperature ranges up to 700° F. and higher and down to normal atmospheric temperatures. These requirements pose the very difficult problem of finding suitable compounds and compositions which are thermally stable at very high temperatures, but are still fluid at lower temperatures. The fluids must also possess adequate temperature-viscosity properties and suitable lubricity, i.e., the fluids must not get too thin at the very high temperatures and/or too thick at the lower temperatures, thereby requiring a wide fluid range, and must possess adequate lubricating characteristics over the range of temperatures to which a particular fluid system is subjected. The fluids should possess relatively low vapor pressure to preclude their volatilization at elevated operating temperatures.

As is seen from the foregoing requirements, a functional fluid has to be fluid at ambient temperature. This fluid property is necessary in order for a fluid to perform its intended function, such as the use of a fluid as a hydraulic fluid or heat transfer fluid. Thus, a hydraulic system has to function at ambient temperature or below, while in the case of a heat transfer system, a fluid must be capable of functioning both during a heating cycle and a cooling cycle. Thus, compounds which are solid at ambient temperature cannot perform their intended function.

It is, therefore, an object of this invenion to provide compounds which are fluid at ambient temperature and functional fluid compositions which are enriched in compounds which are fluid at ambient temperature.

It has now been found that a solid phenoxybiphenyl compound and compositions containing one or more solid phenoxybiphenyl compounds can be converted to a useful fluid compound or composition enriched in fluid compounds by contacting a solid phenoxybiphenyl compound or composition containing one or more solid phenoxybiphenyl compounds with an effective amount of (a) hydrogen chloride and (b) a catalyst selected from the group consisting of aluminum trichloride, aluminum tribromide, gallium trichloride, stannic chloride and antimony pentachloride.

The process of this invention is particularly applicable to converting solid phenoxybiphenyl compounds and compositions to fluid phenoxybiphenyl compounds. By "fluid" phenoxybiphenyl compound or composition is meant those fluid compounds and compositions which are fluid, that is, mobile, at ordinary temperatures, that is, above about 30° F. In addition, compositions containing one or more solid phenoxybiphenyls are enriched in fluid phenoxybiphenyl compounds in carrying out the process of this invention. Thus, compositions which contain, for example 100% solid phenoxybiphenyl compounds are converted to compositions containing anywhere from about 60% to 95% or more of fluid phenoxybiphenyl compounds. In certain instances, depending on the particular solid phenoxybiphenyl compound which is converted, a composition enriched in fluid phenoxybiphenyl compounds will be a sludge at ambient temperature. However, such compositions which are a sludge at ambient temperature can be converted to fluid compositions by, for example, selectively removing certain solid phenoxybiphenyl compounds which cause sludging. However, as is evident from the high yields of fluid phenoxybiphenyl compounds which are produced by the process of this invention such amount of solid material which is removed is small in comparison to the amount of solid phenoxybiphenyl compound that existed prior to the carrying out the process of this invention.

The concentration of hydrogen chloride and the various catalysts that can be used, that is, aluminum trichloride, aluminum tribromide, gallium trichloride, stannic chloride and antimony pentachloride, hereinafter referred to as "catalysts," is that concentration which is sufficient to convert a solid phenoxybiphenyl or composition containing one or more solid phenoxybiphenyls to a fluid phenoxybiphenyl compound or phenoxybiphenyl composition enriched in fluid phenoxybiphenyls. In general, the amount of catalyst employed in the conversion reaction can vary from about 0.1 to about 25% by weight or more, and preferably from about 0.5 to about 15% by weight, based on the weight of the phenoxybiphenyl compound or composition. The amount of hydogen chloride which can be employed with the catalyst is in general an amount sufficient to about saturate the reaction mixture at the reaction temperature, or the hydrogen chloride can be passed through the reaction mixture constantly during the course of the reaction. It will also be understood that the reaction mixture can be treated with hydrogen chloride at room temperature prior to heating or added after heating said reaction mixture to a higher temperature. The temperature at which the process of this invention is carried out can vary over a wide range and in general the temperature that is utilized is from about 50° C. to about 300° C., preferably from about 100° C. to about 250° C. The time that is utilized in carrying out the process of this invention can be varied over a wide range and in general is from about 15 minutes to about 25 hours, preferably from about one hour to about 5 hours.

Whereas all of the catalysts can be utilized and are contemplated within the scope of this invention, the preferred catalysts are aluminum trichloride, aluminum tribromide and gallium trichloride. In addition, with respect to the preferred group of catalysts, aluminum trichloride is the preferred catalyst.

The hydrogen chloride that is utilized together with the catalyst as described above can be diluted with other gases such as nitrogen and can to a limited extent contain water. However, water can only be tolerated at a concentration such that it does not completely nullify the catalytic activity of a given catalyst to effect conversion of a solid phenoxybiphenyl compound or composition containing one or more solid phenoxybiphenyl. However, in carrying out the process of this invention, it is preferred to use dry hydrogen chloride and still more preferred to use anhydrous hydrogen chloride.

Typical examples of fluid phenoxybiphenyl compounds which can be prepared utilizing the process of this invention are 2,3'-diphenoxybiphenyl,
3,3'-diphenoxybiphenyl,
3,4'-diphenoxybiphenyl,
3,3'-di(o-phenoxyphenoxy)biphenyl,
3,4'-di(o-phenoxyphenoxy)biphenyl,
2,3'-di(o-phenoxyphenoxy)biphenyl,
3-(p-phenoxyphenoxy)-3-(m-phenoxyphenoxy) biphenyl,
3-(p-phenoxyphenoxy)-4'-(m-phenoxyphenoxy) biphenyl and
2-(p-phenoxyphenoxy)-3'-(m-phenoxyphenoxy) biphenyl.

The solid phenoxybiphenyls include, by way of example, the solid diphenoxybiphenyls, the solid tris- and tetraphenoxybiphenyls, solid phenoxy (phenoxyphenoxy) biphenyl and solid bis(phenoxyphenoxybiphenyls. Examples of specific solid phenoxybiphenyls are 4,4'-diphenoxybiphenyl,
2,4'-diphenoxybiphenyl,
2,2'-diphenoxybiphenyl,
2,3-diphenoxybiphenyl,
4-(m-phenoxyphenoxy-4'-(p-phenoxyphenoxy) biphenyl and
2-(m-phenoxyphenoxy)-2'-(p-phinoxyphenoxy) biphenyl.

The above examples of solid phenoxybiphenyls can be converted singly or as a mixed composition to produce a fluid phenoxybiphenyl compound or composition enriched in fluid phenoxybiphenyls. However, it has been found that certain phenoxybiphenyls, and in particular 4,4'-diphenoxybiphenyl, can cause a fluid diphenoxybiphenyl composition to become a sludge at ambient temperature at concentrations even as low as 2%. Thus, solid phenoxybiphenyl compounds and compositions will undergo conversion whereby the composition enriched in fluid phenoxybiphenyls will still be a solid at ambient tempertature even though a solid phenoxybiphenyl has been converted extensively to one or more fluid phenoxybiphenyls. Such a solid composition can be obtained as has been stated above by the presence of, for example, 4,4'-diphenoxybiphenyl. The process of this invention includes the preparation of such fluid phenoxybiphenyl compounds and compositions as long as fluid phenoxybiphenyls are produced utilizing the process of this invention. The deficiency of a particular compound which causes the formation of a non-fluid sludge at room temperature can be overcome by the substantial removal of the sludging compound such as 4,4'-diphenoxybiphenyl from the mixed composition by treatment with a non-polar solvent, such as, substituted alkanes and cycloalkanes containing from about 5 to about 10 carbon atoms. such as pentane, hexane, 2-methylhexane, 2,4-dimethylhexane, 2-ethylhexane, heptane, 2,6-dimethylheptane, 4-ethylheptane, octane, 3-methyloctane, 2,7-dimethyloctane, nonane, decane, cyclopentane, cyclohexane, methylcyclohexane, 1,3-dimethylcyclohexane, 1,3,5 - trimethylcyclohexane, isopropylhexane, cycloheptane, cyclooctane and the like and mixtures thereof, including commercial mixtures such as any crude gasoline cut. The recovered 4,4' - diphenoxybiphenyl fraction can then be converted whereby the solid high melting point 4,4'-diphenoxybiphenyl can be substantially completely converted to useful fluid compositions. The major components in general from the conversion of 4,4'-diphenoxybiphenyl are 3,3'-diphenoxybiphenyl (about 41%) and 3,4'-diphenoxybiphenyl (about 45%).

The fluid phenoxybiphenyl compounds and compositions are particularly useful at thermally stable functional fluids. As is seen from the conversion of 4,4'-diphenoxybiphenyl to fluid phenoxybiphenyl, a yield of approximately 86% was obtained. Both 3,3'- and 3,4'-diphenoxybiphenyl are fluids at ambient temperature and such compounds and mixtures thereof find wide utility in the aforedescribed function fluid systems. In particular, such fluid phenoxybiphenyl compounds and compositions find wide utility among which are for use as hydraulic fluids and heat transfer fluids. The fluid phenoxybiphenyl compounds have the requisite fluidity at ambient temperature and in addition have a high decomposition point and high boiling point. These particular properties make the fluid phenoxybiphenyl compounds and composition extremely valuable as heat transfer fluids since such compounds and compositions can be used both on a heating cycle and on a cooling cycle. Additionally such fluid phenoxybiphenyl compounds and compositions can be formulated and are compatible with polyphenyl ether compounds and compositions, wherein the said fluid phenoxybiphenyl compounds and compositions comprise from about 50, preferably up to about 65, and more preferably still up to about 80 weight percent of such mixed compositions. To assure good fluid properties of such mixed compositions, the polyphenyl ether compounds preferably should have at least about 40 percent of their linkages in the meta configuration. Whereas the unsubstituted compounds are preferred components of the above compositions, low molecular weight tert-alkyl radicals, such as the tert-butyl radical, or α-cumyl radicals can be substituted on the individual compounds, but preferably not more than two such radicals can be substituted on any individual compound and preferably such substituents are on the terminal radicals of the said compounds and substituted in the meta position.

Additionally, especially when a functional fluid is not exposed to extreme conditions of high temperature and radiation, the phenoxybiphenyl compounds and compositions and various compositions thereof with polyphenyl ether compounds and compositions can contain hydrocarbyl substituents thereon such as unsubstituted alkyl, cycloalkyl, aralkyl, aryl and alkaryl groups, but the preferred members of such hydrocarbyl substituents are those wherein the carbon atom bonding said substituent to the benzenoid ring is free from hydrogen atoms, e.g., the tert-butyl group and α-cumyl group hereinabove set out. Preferably such unsubstituted hydrocarbyl substituent groups should not contain more than 12 carbon atoms in each group and more preferably still should not contain more than 9 carbon atoms in each group and the total carbon atoms in the sum of the hydrocarbyl group substituents on any compound should preferably not exceed 25 and more preferably still should not exceed 18. Additionally, the hydrocarbyl groups substituted on the terminal benzenoid rings of the phenoxybiphenyl compounds or the polyphenyl ether compounds, are in the meta position with respect to the linkage of such benzenoid ring moiety of the compound and any substituents on the aromatic ring in the alkaryl and aralkyl groups preferably are also in the meta position with respect to the linkage joining such group to the benzenoid ring of the aforesaid compounds. Illustrative examples of such suitable unsubstituted hydrocarbyl groups are methyl, ethyl, isopropyl, tert-butyl, isobutyl, tert-amyl, neopentyl, 2-ethylhexyl, cyclopropyl, cyclohexyl, 1-methylcyclohexyl, bicyclohexylyl, β-decahydronaphthyl, benzyl, phenethyl, α-mesityl, α-cumyl, benzohydryl, phenyl, tolyl, xylyl and the like.

Illustrative polyphenyl ether compounds are bis(m-phenoxyphenyl) ether,
m-bis-(m-phenoxyphenoxy)benzene,
bis[m-(m-phenoxyphenoxy)phenyl] ether,
m-bis[m-(m-phenoxyphenoxy)phenoxy]benzene,
m-(m-phenoxyphenoxy)phenyl p-phenoxyphenyl ether,
p-bis(m-phenoxyphenoxy)benzene,
bis[p-(m-phenoxyphenoxy)phenyl] ether,
m-bis[m-(p-phenoxyphenoxy)phenoxy]benzene,
m-bis[m-(m-tert-butylphenoxy)phenoxy]benzene,
bis-[m-(m-β-cumylphenoxy)phenyl] ether and the like.

The aforesaid fluid phenoxybiphenyl compounds and compositions and mixtures thereof together with polyphenyl ether compounds, as set out hereinabove, have been found to be exceptionally good functional fluids having the combination of thermal stability, oxidation stability, hydrolytic stability, radiation stability, pour points below normal atmospheric temperature, low vapor pressure at elevated temperatures, a wide fluid range, good viscosity properties, good lubricity, an extended useful life at elevated temperatures, and are substantially free from corrosive action. The fluid phenoxybiphenyl compounds and compositions are particularly useful as inexpensive, high temperature heat transfer fluids. Such compounds and compositions are also useful as high-vacuum diffusion pump oils, lubricants and heat-transfer fluids in jet engines, including stationary jet power units, other type engines and missiles, heat transfer and dielectric fluids for electronics apparatus and other electrical equipment, such as high voltage transformers, etc., hydraulic fluids for supersonic aircraft and missiles, coolant moderators for nuclear reactors and the like.

The following examples are illustrative of the process of this invention.

EXAMPLE 1

A 25 g. sample of 4,4'-diphenoxybiphenyl (.074 mole) was heated to 210° C. to assure complete melting of the compound. The said compound was saturated with dry hydrogen chloride and then 4 g. of anhydrous aluminum chloride catalyst was added thereto over a 10 minute period and the reaction temperature was observed to rise to about 240° C. for about 0.5 hour. Dry hydrogen chloride gas was continuously introduced into the reaction mixture over the total reaction time of 1.5 hours to maintain said reaction mixture saturated with hydrogen chloride. The final reaction temperature at the end of the 1.5 hour reaction time was observed to be 210° C. The reaction mixture was cooled to 100° C., taken up with carbon tetrachloride, and filtered through Hy Flo Super Cel. The organic filtrate was then washed with a saturated aqueous solution of sodium bicarbonate, filtered through Hy Flo Super Cel. The organic filtrate was then washed with a saturated aqueous solution of sodium bicarbonate, filtered through Hy Flo Super Cel, the organic layer separated and dried over anhydrous magnesium sulfate, filtered, and the carbon tetrachloride removed therefrom under reduced pressure. The reaction mixture was then fractionally distilled and the crude converted diphenoxybiphenyl composition having a boiling range of 165° C. to 220° C. at 0.2 mm. of mercury recovered. This crude product was observed to sludge up or solidify at room temperature. The aforesaid crude product was warmed in an oven until clear and homogenous, then treated with an equal volume of hexane with stirring and the small amount of unconverted residual 4,4'-diphenoxybiphenyl was observed to precipitate out of the composition within a few minutes. The precipitate was filtered therefrom, the hexane removed from the diphenoxybiphenyl composition under vacuum and the product fractionally distilled, recovering a cut having a boiling range of 180° C. to 212° C. at 0.2 mm. of mercury. This clear diphenoxybiphenyl composition was observed to have a viscosity in centistokes at the temperatures indicated therewith of 20,000 at 44° F., 189.9 at 100° F., 8.314 at 210° F., 1.545 at 400° F., 0.965 at 500° F., 0.677 at 600° F., 0.507 at 700° F. and 0.397 at 800° F.

Accordingly, the subject fluid diphenoxybiphenyl compositions can be prepared by the phenoxylation of a dihalobiphenyl compound, or mixed composition of dihalobiphenyls, with subsequent conversion of such compound or composition and precipitation of any small residual amount of 4,4'-diphenoxybiphenyl therefrom.

EXAMPLE 2

A 118 g. sample of a solid mixed composition of diphenoxybiphenyls, prepared by the diphenoxylation of a mixed composition of dichlorobiphenyls (the 2,4'-, 2,2'- and 4,4'-isomers comprising the major components therein) by the Ullmann condensation reaction employing cuprous chloride catalyst, was introduced into a reaction vessel, heated to about 180° C., and saturated with anhydrous hydrogen chloride. Then 13.1 g. of anhydrous aluminum trichloride was added thereto and the anhydrous hydrogen chloride continued to be bubbled through the reaction mixture during the total reaction time of 2 hours wherein the reaction temperature varied from about 180° C. to about 190° C. The reaction mixture was then cooled and treated in a similar manner to that set out in Example 1. The crude converted diphenoxybiphenyl composition had a boiling range of from about 170° C. to about 210° C. at 0.04 mm. of mercury. This crude composition was then warmed on a steam bath and treated with hexane to precipitate and effect the removal of the small amount of unconverted 4,4'- diphenoxybiphenyl remaining in the mixed composition. The composition was then fractionally distilled to remove the hexane and the composition boiling over the range of 178° C. to 200° C. at 0.04 mm. of mercury was recovered as product. This product comprising a mixture of diphenoxybiphenyls, the 3,3'- and 3,4'-isomers comprising the major components therein, was found to be a stable fluid composition at normal temperatures.

As is seen from the foregoing examples, solid phenoxybiphenyls were converted to fluid phenoxybiphenyl compounds and compositions in excellent yield. In particular, Examples 1 and 2 clearly demonstrate the high yields which are obtained in carrying out the process of this invention. Thus, only small residual amounts of the phenoxybiphenyl remained after treatment of solid phenoxybiphenyl compounds.

While this invnetion has been described with respect to various specific examples and embodiments, it is to be understood that the invention is not limited thereto and that it can be variously practiced within the scope of the following claims.

What is claimed is:

1. A process comprising, contacting at a temperature of from about 50° C. to about 300° C. one or more phenoxybiphenyl compounds having a melting point above about 72° F. with (a) hydrogen chloride and (b) from 0.1 to about 25% by weight of the phenoxybiphenyl compound of a catalyst selected from the group consisting of aluminum trichloride, aluminum tribromide, gallium trichloride, stannic chloride and antimony pentachloride and mixtures thereof.

2. A process of claim 1 wherein the catalyst is selected from the group consisting of aluminum trichloride, aluminum tribromide and gallium trichloride.

3. A process of claim 1 wherein the catalyst is aluminum trichloride.

4. A process of claim 2 wherein the phenoxybiphenyl compound is a diphenoxybiphenyl selected from the group consisting of 2,2'-diphenoxybiphenyl, 2,4'-diphenoxybiphenyl and 4,4'-diphenoxybiphenyl.

5. A process of claim 1 wherein the temperature range is from about 100° C. to about 250° C.

6. A process of claim 2 wherein the temperature range is from about 100° C. to about 250° C.

7. A process of claim 1 wherein the catalyst is present in an amount of from 0.5% to about 15% by weight of the phenoxybiphenyl compound.

References Cited

UNITED STATES PATENTS

| | | | |
|---|---|---|---|
| 3,406,207 | 10/1968 | Schisla et al. | 260—613 |
| 2,523,707 | 9/1950 | Miller | 260—612X |
| 2,617,838 | 11/1952 | Nickels | 260—621(E)UX |
| 3,221,058 | 11/1965 | Engelsma et al. | 260—613 |

FOREIGN PATENTS

| | | | |
|---|---|---|---|
| 555,751 | 9/1943 | Great Britain | 260—621(E) |
| 917,950 | 2/1963 | Great Britain | 260—612 |
| 1,268,854 | 6/1961 | France | 260—612 |

BERNARD HELFIN, Primary Examiner

U.S. Cl. X.R.

252—52, 64, 67, 73